(12) United States Patent
Wang (10) Patent No.: US 10,095,666 B2
(45) Date of Patent: Oct. 9, 2018

(54) METHOD AND TERMINAL FOR ADDING QUICK LINK

(71) Applicant: TENCENT TECHNOLOGY (SHENZHEN) COMPANY LIMITED, Shenzhen, Guangdong (CN)

(72) Inventor: Lei Wang, Guangdong (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 896 days.

(21) Appl. No.: 14/262,016

(22) Filed: Apr. 25, 2014

(65) Prior Publication Data

US 2014/0317483 A1 Oct. 23, 2014

Related U.S. Application Data

(63) Continuation of application No. PCT/CN2012/077359, filed on Jun. 21, 2012.

(30) Foreign Application Priority Data

Oct. 26, 2011 (CN) .......................... 2011 1 0329284

(51) Int. Cl.
*G06F 17/00* (2006.01)
*G06F 17/22* (2006.01)
(Continued)

(52) U.S. Cl.
CPC ...... *G06F 17/2235* (2013.01); *G06F 3/04817* (2013.01); *G06F 17/2247* (2013.01); *G06F 17/3089* (2013.01)

(58) Field of Classification Search
None
See application file for complete search history.

(56) References Cited

U.S. PATENT DOCUMENTS 6,184,886 B1 * 2/2001 Bates ................ G06F 17/30884
707/E17.114
6,460,038 B1 * 10/2002 Khan ................ G06F 17/30884
(Continued)

FOREIGN PATENT DOCUMENTS

CN 101266623 A 9/2008
CN 101840413 A 9/2010
(Continued)

OTHER PUBLICATIONS

Office Action Issued in Chinese Patent Application No. 201110329284. 5, dated Sep. 29, 2013 in 10 pages.
(Continued)

*Primary Examiner* — Howard Cortes
(74) *Attorney, Agent, or Firm* — Morgan, Lewis & Bockius LLP (57) ABSTRACT

Disclosed are a method and terminal for adding a quick link. The method includes: receiving a URL and a title of a quick link to be added to a main page, the URL and the title being input by a user; searching in a pre-stored mapping relationship between URLs and icons according to the URL of the quick link; and if a corresponding icon is found, adding the corresponding icon to the main page, drawing the title of the quick link on the corresponding icon, and binding the URL of the quick link to the corresponding icon. The terminal includes: a receiving module, a searching module, and an adding module. With the method, network traffic is saved and user experience is improved.

9 Claims, 3 Drawing Sheets

(51) Int. Cl.
*G06F 17/30* (2006.01)
*G06F 3/0481* (2013.01)

(56) References Cited

U.S. PATENT DOCUMENTS

| | | | | |
|---|---|---|---|---|
| 8,375,333 | B2* | 2/2013 | Kang | G06F 3/0482 345/173 |
| 8,386,955 | B1* | 2/2013 | Weber | G06F 3/0482 715/781 |
| 8,402,375 | B1* | 3/2013 | Skare | G06F 17/30884 714/744 |
| 8,411,112 | B1* | 4/2013 | Ainslie | G09G 5/026 345/589 |
| 2002/0154167 | A1* | 10/2002 | Parsons, III | G06F 17/30873 715/764 |
| 2003/0146939 | A1* | 8/2003 | Petropoulos | G06F 17/30696 715/810 |
| 2005/0039144 | A1* | 2/2005 | Wada | G06F 3/0481 715/840 |
| 2008/0059906 | A1* | 3/2008 | Toki | G11B 27/34 715/810 |
| 2008/0282196 | A1* | 11/2008 | Park | H04M 1/72544 715/838 |
| 2008/0301555 | A1* | 12/2008 | Vartiainen | G06F 17/30876 715/704 |
| 2008/0313722 | A1* | 12/2008 | Cho | G06F 3/0481 726/7 |
| 2009/0178006 | A1* | 7/2009 | Lemay | G06F 3/04817 715/835 |
| 2009/0199106 | A1* | 8/2009 | Jonsson | G06F 17/30884 715/744 |
| 2009/0235153 | A1* | 9/2009 | Otsuka | G06F 17/2235 715/208 |
| 2010/0162168 | A1* | 6/2010 | Lee | G06Q 10/107 715/821 |
| 2011/0145688 | A1* | 6/2011 | Han | H04M 1/72561 715/206 |
| 2012/0278757 | A1* | 11/2012 | Shah | G06F 9/4443 715/790 |
| 2013/0061160 | A1* | 3/2013 | Tseng | G06F 17/30905 715/760 |
| 2015/0161124 | A1* | 6/2015 | Keshava | G06F 17/30905 707/709 |

FOREIGN PATENT DOCUMENTS

| | | |
|---|---|---|
| CN | 101957829 A | 1/2011 |
| CN | 101989279 A | 3/2011 |

OTHER PUBLICATIONS

International Search Report for International Application No. PCT/CN2012/077359 dated Oct. 4, 2012 in 4 pages.

* cited by examiner

METHOD AND TERMINAL FOR ADDING QUICK LINK

This application is a continuation of International Application No. PCT/CN2012/077359, filed on Jun. 21, 2012, which claims priority to Chinese Patent Application No. 201110329284.5, filed before Chinese Patent Office on Oct. 26, 2011 and entitled "METHOD AND TERMINAL FOR ADDING QUICK LINK." The disclosure of each of these prior applications is incorporated herein by reference in its entirety.

TECHNICAL FIELD

The present disclosure relates to the field of mobile communications, and in particular, to a method and terminal for adding a quick link.

BACKGROUND

Currently, a mobile phone browser provides a function of adding a quick link, and a user can add a quick link to a main page opened by the mobile phone browser by using this function. In addition, using the quick link, the user can directly open a website by clicking the added quick link.

The process of adding a quick link may be specifically as follows: The user inputs the title and the uniform resource locator (URL) of the quick link to be added to the mobile phone browser, the mobile phone browser extracts a corresponding web page according to the URL input by the user, captures a screenshot for the extracted web page, and uses the captured screenshot as an icon of the quick link to be added and places the icon on the main page of the mobile phone browser, draws the title input by the user on the icon, and binds the URL input by the user to the icon. In this way, the quick link is successfully added.

During the implementation of the present disclosure, the inventor finds that the prior art has at least the following problems:

A web page needs to be extracted when acquiring a quick link to be added, which consumes network traffic; in addition, extraction of a web page takes a time, and the user needs to wait for a period of time, consequently reducing user experience.

SUMMARY

To save network traffic and improve user experience, embodiments of the present disclosure provide a method and terminal for adding a quick link. The technical solutions are as follows:

A method for adding a quick link includes:

receiving a URL and a title of a quick link to be added to a main page, the URL and the title being input by a user;

searching an icon in a pre-stored mapping relationship between URLs and icons according to the URL of the quick link; and if a corresponding icon is found, adding the corresponding icon to the main page, drawing the title of the quick link on the corresponding icon, and binding the URL of the quick link to the corresponding icon.

A terminal for adding a quick link includes:

a receiving module, configured to receive a uniform resource locator (URL) and a title of a quick link to be added to a main page, the URL and the title being input by a user;

a searching module, configured to search an icon in a pre-stored mapping relationship between URLs and icons according to the URL of the quick link received by the receiving module; and an adding module, configured to: if the searching module finds a corresponding icon, add the corresponding icon to the main page, draw the title of the quick link on the corresponding icon, and bind the URL of the quick link to the corresponding icon.

A terminal, including one or more programs which are stored in the memory and configured to be executed by one or more processors, the one or more programs including instructions for performing the following method:

receiving a uniform resource locator (URL) and a title of a quick link to be added to a main page, the URL and the title being input by a user;

searching an icon in a pre-stored mapping relationship between URLs and icons according to the URL of the quick link; and if a corresponding icon is found, adding the corresponding icon to the main page, drawing the title of the quick link on the corresponding icon, and binding the URL of the quick link to the corresponding icon.

According to the present disclosure, user's input URL and title of a quick link to be added are received; a pre-stored mapping relationship between URLs and icons is searched for a corresponding icon; if the corresponding icon is found, the icon is added to a main page, the title of the quick link is drawn on the icon, and the URL of the quick link is bound to the icon. In this way, the quick link is successfully added. In addition, a web page does not need to be extracted in the process of adding the quick link, which saves network traffic; and further, the user does not need to wait for a period of time, thereby improving efficiency in adding a quick link and enhancing user experience.

DETAILED DESCRIPTION

To make the objectives, technical solutions, and advantages of the present disclosure clearer, the embodiments of the present disclosure are described in detail below with reference to the accompanying drawings.

Figure 1:
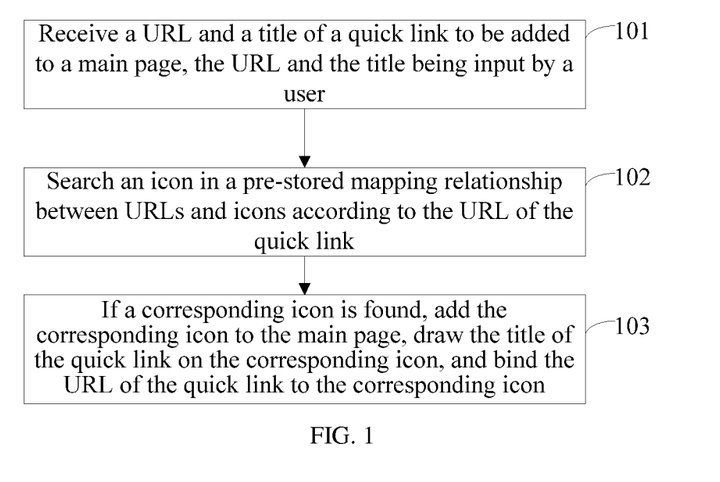
FIG. 1 is a flowchart of a method for adding a quick link according to an embodiment of the present disclosure.

As illustrated in FIG. 1, an embodiment of the present disclosure provides a method for adding a quick link, including:

step 101: receiving a URL and a title of a quick link to be added to a main page, the URL and the title being input by a user;

step 102: searching an icon in a pre-stored mapping relationship between URLs and icons according to the URL of the quick link; and step 103: if a corresponding icon is found, adding the corresponding icon to the main page, drawing the title of the quick link on the corresponding icon, and binding the URL of the quick link to the corresponding icon.

According to the embodiments of the present disclosure, user's input URL and title of a quick link to be added are received; a pre-stored mapping relationship between URLs and icons is searched for a corresponding icon; if the corresponding icon is found, the icon is added to a main page, the title of the quick link is drawn on the icon, and the URL of the quick link is bound to the icon. In this way, the quick link is successfully added. In addition, a web page does not need to be extracted in the process of adding the quick link, which saves network traffic; and further, the user does not need to wait for a period of time, thereby improving efficiency in adding a quick link and enhancing user experience.

Figure 2:
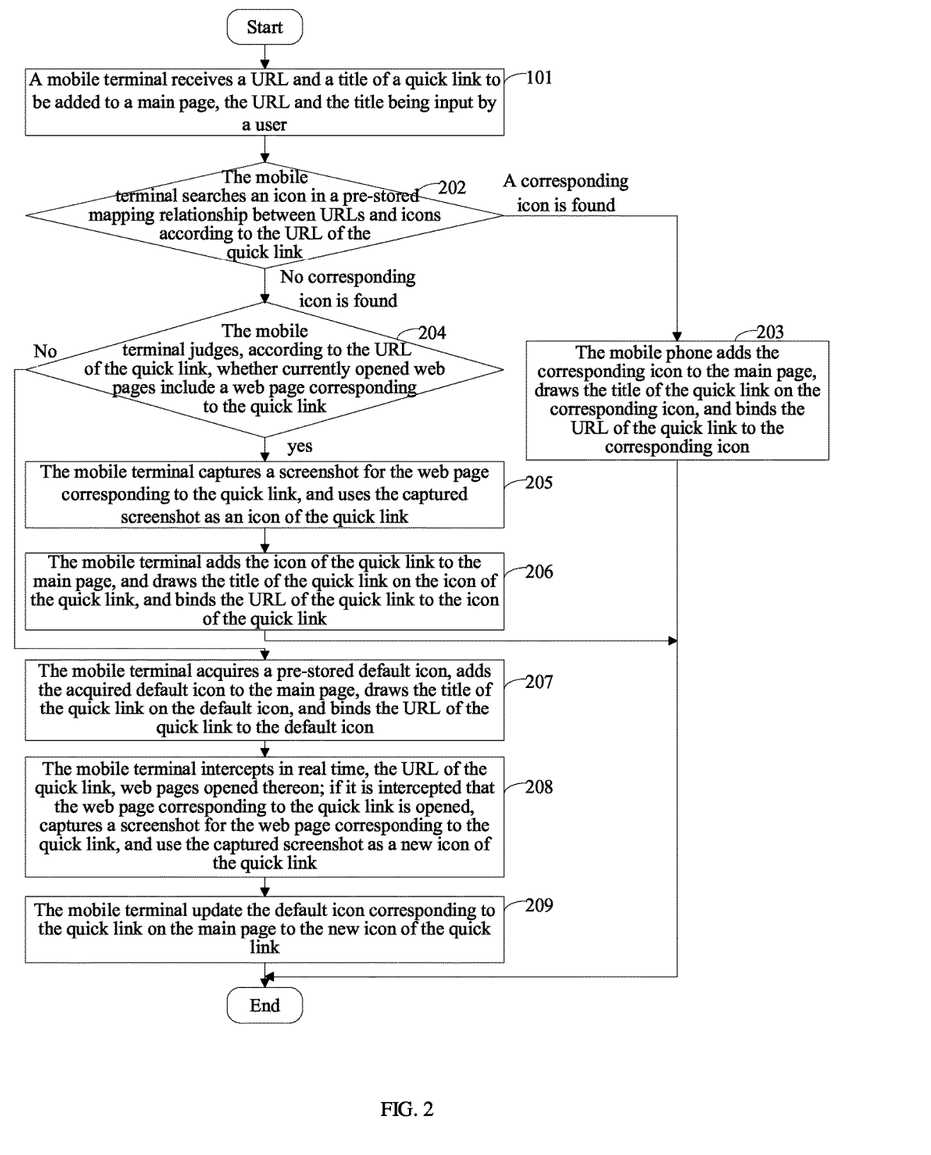
FIG. 2 is a flowchart of a method for adding a quick link according to an embodiment of the present disclosure.

As illustrated in FIG. 2, an embodiment of the present disclosure provides a method for adding a quick link, including:

Step 201: A mobile terminal receives a URL and a title of a quick link to be added to a main page, the URL and the title being input by a user.

The user may open the main page of the browser on the mobile terminal, and then inputs the URL and the title of the quick link to be added to the main page, to the mobile terminal. The quick link needs to be added to a preset area on the main page.

For example, the user opens the main page of the browser on the mobile terminal, and inputs the URL "www.baidu.com" and the title "Baidu" of the quick link to be added to the main page to the mobile terminal, wherein the quick link needs to be added to the preset area on the main page; and the mobile terminal receives the URL "www.baidu.com" and the title "Baidu" of the quick link.

Step 202: The mobile terminal searches an icon in a pre-stored mapping relationship between URLs and icons according to the URL of the quick link; if a corresponding icon is found, step 203 is performed; and otherwise, step 204 is performed.

The mobile terminal may acquire URLs and icons of currently hot websites from a network server in advance, and stores the acquired URLs and icons of the currently hot websites into the pre-stored mapping relationship between URLs and icons.

In this embodiment, a person skilled in the art stores the URLs and icons of the currently hot websites into the network server. For example, Tencent, Baidu, and Sina, and so on are all currently hot websites, and a person skilled in the art may store the URL "www.QQ.com" and the icon of Tencent, the URL "www.baidu.com" and the icon of Baidu, and the URL "www.sina.com" and the icon of Sina into the network server.

The mobile terminal may acquire the URL "www.QQ.com" and the icon of Tencent from the network server, the URL "www.baidu.com" and the icon of Baidu, and the URL "www.sina.com" and the icon of Sina from the network server in advance, and store these acquired URLs and icons into the mapping relationship of URLs and icons illustrated in Table 1.

TABLE 1

| Website URL | Website Icon |
|---|---|
| www.baidu.com | Baidu icon |
| www.QQ.com | Tencent icon |
| www.sina.com | Sina icon |
| . . . | . . . |

Upon receiving the URL "www.baidu.com" and title "Baidu" of the quick link input by the user, the mobile terminal searches an icon in the mapping relationship between URLs and icons as illustrated in Table 1 according to the URL "www.baidu.com" of the quick link, and finds from the mapping relationship that the corresponding icon is the Baidu icon.

An installation package corresponding to the browser used by the mobile terminal may include a mapping relationship between URLs and icons of the currently hot websites; during installation of the browser on the mobile terminal, the mapping relationships between URLs and icons contained in the installation package corresponding to the browser may be stored.

Step 203: The mobile terminal adds the corresponding icon to the main page, draws the title of the quick link on the corresponding icon, and binds the URL of the quick link to the corresponding icon; and then the process ends.

Specifically, the mobile terminal draws the title of the quick link on the corresponding icon, generates a segment of hyperlink codes, sets rendering information of the segment of hyperlink codes to the drawn icon, and sets link information of the segment of hyperlink codes to the URL of the quick link, to implement binding of the drawn icon to the URL of the quick link, and add the segment of hyperlink codes to the preset area on the main page. After the segment of hyperlink codes is added to the preset area on the main page, the quick link is displayed in the preset area on the main page.

For example, the mobile terminal adds the Baidu icon to the main page, draws the title "Baidu" of the quick link input by the user on the Baidu icon, and binds the URL "www.baidu.com" of the quick link input by the user to the Baidu icon. In this way, the quick link is successfully added to the main page of the browser.

Step 204: The mobile terminal judges, according to the URL of the quick link, whether currently opened web pages include the web page corresponding to the quick link; if true, step 205 is performed; and otherwise, step 207 is performed.

Specifically, the mobile terminal compares the URL of the quick link with the URLs of the web pages that are currently opened on the mobile terminal respectively; if a web page whose URL is the same as the URL of the quick link is found, it is judged that the mobile terminal has opened the web page corresponding to the quick link, and the web page whose URL is the same as the URL of the quick link is the web page corresponding to the quick link; and if no web page whose URL is the same as the URL of the quick link is found, it is judged that the mobile terminal has not opened the web page corresponding to the quick link.

Step 205: The mobile terminal captures a screenshot for the web page corresponding to the quick link, and uses the captured screenshot as an icon of the quick link.

The mobile terminal may capture a screenshot using a conventional screenshot algorithm. The specific process of capturing the screenshot for the web page corresponding to the quick link is not further detailed in this embodiment.

For example, when the user inputs the URL "www.sohu.com" and title "Sohu" of a to-be-added quick link to the mobile terminal, the mobile terminal searches an icon in the mapping relationship between URLs and icons as illustrated in Table 1 according to the URL "www.sohu.com" of the quick link input by the user, and no corresponding icon has been found from the mapping relationship; subsequently, the mobile terminal judges, according to the URL "www.sohu.com" of the quick link, whether currently opened web pages include the web page of Sohu corresponding to the quick link. Assume that the web pages currently opened on the mobile terminal include the web page of Sohu, then the mobile terminal captures a screenshot for the web page of Sohu corresponding to the quick link, and uses the captured screenshot as the icon of the quick link, i.e., the Sohu icon.

Step 206: The mobile terminal adds the icon of the quick link to the main page, and draws the title of the quick link on the icon of the quick link, and binds the URL of the quick link to the icon of the quick link; and then the process ends.

Specifically, the mobile terminal draws the title of the quick link on the corresponding icon, generates a segment of hyperlink codes, sets rendering information of the segment of hyperlink codes to the drawn icon, and sets link information of the segment of hyperlink codes to the URL of the quick link, to implement binding of the drawn icon to the URL of the quick link, and add the segment of hyperlink codes to the preset area on the main page. After the segment of hyperlink codes is added to the preset area on the main page, the quick link is displayed in the preset area on the main page.

For example, the mobile terminal adds the Sohu icon to the main page, draws the title "Sohu" of the quick link input by the user on the Sohu icon, and binds the URL "www-.sohu.com" of the quick link input by the user to the Sohu icon. In this way, the quick link is successfully added.

Step 207: The mobile terminal acquires a pre-stored default icon, adds the acquired default icon to the main page, draws the title of the quick link on the default icon, and binds the URL of the quick link to the default icon.

Specifically, the mobile terminal acquires the pre-stored default icon, draws the title of the quick link to the drawn default icon, generates a segment of hyperlink codes, sets rendering information of the segment of hyperlink codes to the drawn default icon, and sets link information of the segment of hyperlink codes to the URL of the quick link, to implement binding of the drawn icon to the URL of the quick link, and add the segment of hyperlink codes to the preset area on the main page. After the segment of hyperlink codes is added to the preset area on the main page, the quick link is displayed in the preset area on the main page.

The user may set a default icon on the mobile terminal in advance, and then the mobile terminal may store the default icon set by the user; or the mobile terminal may select an icon from the pre-stored mapping relationship between URLs and icons, use the selected icon as the default icon, and store the default icon; or the installation package corresponding to the browser used by the mobile terminal includes a default icon, and the mobile terminal may store, during installation of the browser, the default icon included in the installation package of the browser.

For example, when the user inputs the URL "www.163.com" and title "NetEase" of a to-be-added quick link to the mobile terminal, the mobile terminal searches an icon in the mapping relationship between URLs and icons as illustrated in Table 1 according to the URL "www.163.com" of the quick link input by the user, and no corresponding icon has been found from the mapping relationship; subsequently, the mobile terminal judges, according to the URL "www.163.com" of the quick link, whether currently opened web pages include the web page of NetEase corresponding to the quick link. Assume that the web pages currently opened on the mobile terminal do not include the web page of NetEase, then the mobile terminal acquires a pre-stored default icon, adds the acquired default icon to the main page, draws the title "NetEase" of the quick link on the default icon, and binds the URL "www.163.com" of the quick link to the default icon.

Step 208: The mobile terminal intercepts in real time, according to the URL of the quick link, web pages opened thereon; if it is intercepted that the web page corresponding to the quick link is opened, captures a screenshot for the web page corresponding to the quick link, and uses the captured screenshot as a new icon of the quick link.

Specifically, if the mobile terminal opens a web page, the mobile terminal extracts the URL of the opened web page, compares the extracted URL with the URL of the quick link; if the two URLs are the same, it is intercepted that the web page corresponding to the quick link is opened, and the mobile terminal captures a screenshot for the web page corresponding to the quick link, and uses the captured screenshot as the new icon of the quick link; and if the two URLs are different, it is intercepted that the web page corresponding to the quick link is not opened, and the mobile terminal continues intercepting web pages opened thereon in real time.

For example, the mobile terminal intercepts in real time, according to the URL "www.163.com" of the quick link, web pages opened thereon; if it is intercepted that the web page corresponding to the URL "www.163.com" of the quick link is opened, the mobile terminal captures a screenshot for the web page corresponding to the quick link, and uses the captured screenshot as the new icon of the quick link.

Step 209: The mobile terminal update the default icon corresponding to the quick link on the main page to the new icon of the quick link; and the process ends.

Specifically, the mobile terminal finds, according to the URL of the quick link, a quick link to which the URL of the quick link is bound from the main page, and replaces the default icon corresponding to the found quick link with the new icon of the quick link.

For example, the mobile terminal finds the quick link according to the URL "www.163.com" of the quick link, and replaces the default icon of the quick link with the new NetEase icon.

In this embodiment, a person skilled in the art may periodically acquire URLs and icons of currently hot websites, and update URLs and icons of the websites stored in the network server according to the acquired URLs and icons of the currently hot websites.

Further, the mobile terminal may periodically acquire a URL and an icon of a website from the network server, and update the pre-stored mapping relationship between URLs and icons according to the URL and the icon of the website.

In the embodiments of the present disclosure, the mobile terminal receives a URL and a title of a quick link to be added, the URL and the title being input by the user, and searches an icon in a pre-stored mapping relationship between URLs and icons according to the URL of the quick link; if a corresponding icon is found, the mobile terminal adds the corresponding icon to a main page, draws the title of the quick link on the corresponding icon, and binds the URL of the quick link to the corresponding icon; if no corresponding icon is found from the pre-stored mapping relationship between URLs and icons, the mobile terminal judges whether currently opened web pages include a web page corresponding to the quick link; if the currently opened web pages include the web page corresponding to the quick link, the mobile terminal captures a screenshot for the web page corresponding to the quick link, uses the captured screenshot as a new icon of the quick link, adds the new icon to the main page, draws the title of the quick link on the icon, and binds the URL of the quick link to the icon; if the currently opened web pages do not include the web page corresponding to the quick link, the mobile terminal adds a default icon to the main page, draws the title of the quick link on the default icon, binds the URL of the quick link to the default icon, and intercepts in real time web pages opened thereon; if it is intercepted that the web page corresponding to the quick link is opened, the mobile terminal captures a screenshot for the opened web page to acquire a new icon, and updates the default icon corresponding to the quick link to the new icon. In this way, a web page does not need to be extracted in the process of adding a quick link, which saves network traffic; and further, the user does not need to wait for a period of time, thereby improving efficiency in adding a quick link and enhancing user experience.

Figure 3:
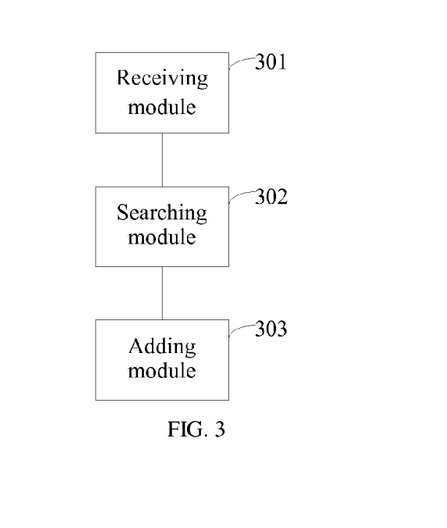
FIG. 3 is a schematic diagram of a terminal for adding a quick link according to an embodiment of the present disclosure.

As illustrated in FIG. 3, an embodiment of the present disclosure provides a terminal for adding a quick link, including:

a receiving module 301, configured to receive a URL and a title of a quick link to be added to a main page, the URL and the title being input by a user;

a searching module 302, configured to search an icon in a pre-stored mapping relationship between URLs and icons according to the URL of the quick link received by the receiving module 301; and an adding module 303, configured to: if the searching module 302 finds a corresponding icon, add the corresponding icon to the main page, draw the title of the quick link on the corresponding icon, and bind the URL of the quick link to the corresponding icon.

Furthermore, the terminal further includes:

a screenshot adding module, configured to: if the searching module 302 does not find a corresponding icon and a web page corresponding to the quick link is opened; capture a screenshot for the web page corresponding to the quick link; use the captured screenshot as the icon of the quick link; add the icon of the quick link to the main page; draw the title of the quick link on the icon of the quick link; and bind the URL of the quick link to the icon of the quick link.

Furthermore, the terminal further includes:

an acquiring and adding module, configured to: if the searching module 302 does not find a corresponding icon and a web page corresponding to the quick link is not opened, acquire a pre-stored default icon; add the default icon to the main page; draw the title of the quick link on the default icon; and bind the URL of the quick link to the default icon.

Furthermore, the terminal further includes:

a first updating module, configured to: intercept in real time, according to the URL of the quick link, web pages opened on a mobile terminal; if it is intercepted that the web page corresponding to the quick link is opened on the mobile terminal, capture a screenshot for the web page corresponding to the quick link; use the captured screenshot as a new icon of the quick link; and update the default icon corresponding to the quick link on the main page to the new icon of the quick link.

Furthermore, the terminal further includes:

a second updating module, configured to acquire a URL and an icon of a website from a network server, and update the pre-stored mapping relationship between URLs and icons according to the URL and the icon of the website.

According to the embodiments of the present disclosure, user's input URL and title of a quick link to be added are received; a pre-stored mapping relationship between URLs and icons is searched for a corresponding icon; if the corresponding icon is found, the icon is added to a main page, the title of the quick link is drawn on the icon, and the URL of the quick link is bound to the icon. In this way, the quick link is successfully added. In addition, a web page does not need to be extracted in the process of adding acquiring a quick link, which saves network traffic; and further, the user does not need to wait for a period of time, thereby improving efficiency in adding a quick link and enhancing user experience.

Figure 4:
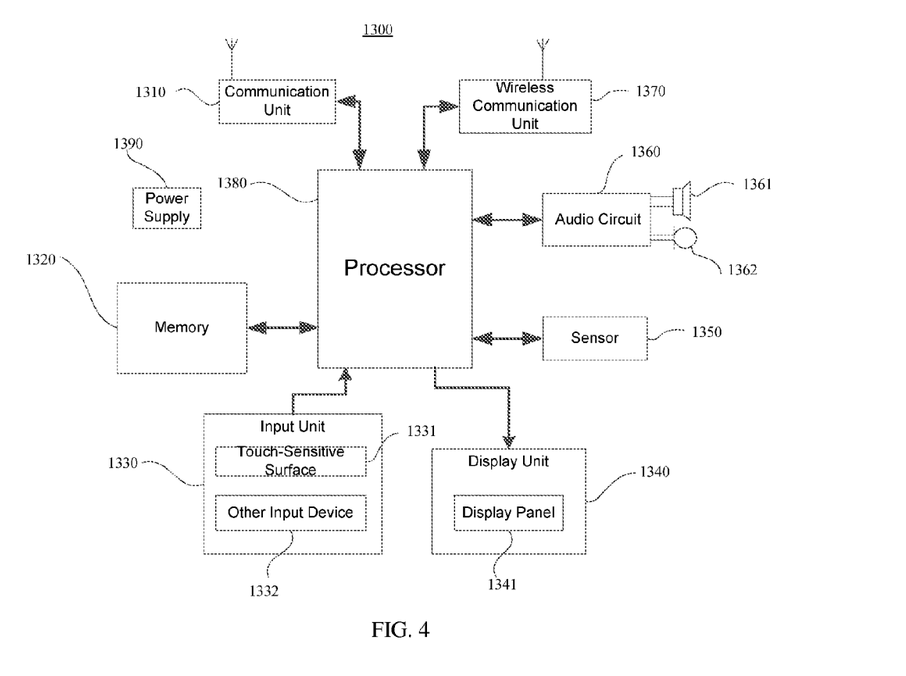
FIG. 4 is a schematic diagram of a terminal according to an embodiment of the present disclosure.

Please refer to FIG. 4, which illustrates a structure schematic diagram of a terminal provided by an embodiment of the present invention. The terminal 1300 may include a communication unit 1310, a memory 1320 having one or more computer readable storage mediums, an input unit 1330, a display unit 1340, a sensor 1350, an audio circuit 1360, a Wireless Fidelity (WIFI) unit 1370, a processor 1380 having one or more processing cores, a power supply 1390, etc. A person skilled in the art shall appreciate that the terminal structure as illustrated in FIG. 4 is not a limitation to the terminal, and more or less parts may be included, or some parts may be combined, or the parts may be arranged differently.

The communication unit 1310 may be configured to receive and transmit signals in the process of information reception and transmission or conversation, and it may be a network communication device such as Radio Frequency (RF) circuit, router, modem, etc. Particularly, when the communication unit 1310 is an RF circuit, it receives downlink information of a base station, transfers the downlink information to one or more processors 1380 for a processing, and transmits uplink data to the base station. Usually, the RF circuit serving as the communication unit includes, but not limited to, an antenna, at least one amplifier, a tuner, one or more oscillators, a Subscriber Identity Module (SIM) card, a transceiver, a coupler, a Low Noise Amplifier (LNA) and a duplexer. In addition, the communication unit 1310 may communicate with the network and other devices through a wireless communication. The wireless communication may use any communication standard or protocol, including, but not limited to, Global System of Mobile communication (GSM), General Packet Radio Service (GPRS), Code Division Multiple Access (CDMA), Wideband Code Division Multiple Access (WCDMA), Long Term Evolution (LTE), email, Short Messaging Service (SMS), etc. The memory 1320 may be configured to store software programs and modules. The processor 1380 performs various function applications and data processing by running the software programs and modules stored in the memory 1320. The memory 1320 mainly includes a program storage area and a data storage area, wherein the program storage area may store an operating system, application programs required by at least one function (e.g., sound playing function and image playing function), etc., and the data storage area may store data created according to the usage of the terminal 1300 (e.g., audio data and telephone book), etc. In addition, the memory 1320 may include a high speed random access memory and a nonvolatile memory, such as at least one disk memory, flash memory or other volatile solid memory. Correspondingly, the memory 1320 may further include a memory controller to provide the processor 1380 and the input unit 1330 with an access to the memory 1320.

The input unit 1330 may be configured to receive inputted digital or character information, and generate a signal input of a keyboard, a mouse, an operating lever or an optical or track ball related to a user's setting or a function control. Preferably, the input unit 1330 may include a touch-sensitive surface 1331 and other input device 1332. The touch-sensitive surface 1331 is also referred to as touch display screen or touch pad, which collects the user's touch operation thereon or nearby (e.g., the user's operation on or near the touch-sensitive surface 1331 using any appropriate object or accessory such as finger and stylus), and drives corresponding connection device according to a preset program. Optionally, the touch-sensitive surface 1331 may include a touch detection device and a touch controller. The touch detection device detects the user's touch direction and a signal brought by the touch operation, and transmits the signal to the touch controller. The touch controller receives touch information from the touch detection device, converts the touch information into contact coordinates and transmits the contact coordinates to the processor 1380, then receives and performs a command from the processor 1380. In addition, the touch-sensitive surface 1331 may be implemented in multiple types such as resistance type, capacitance type, infrared ray and surface acoustic wave. In addition to the touch-sensitive surface 1331, the input unit 1330 may include other input device 1332. Preferably, other input device 1332 may include, but not limited to, one or more of a physical keyboard, a functional key (e.g., volume control key and on-off key), a trackball, a mouse and an operating lever etc.

The display unit 1340 may be configured to display information inputted to the user or information provided by the user, and various graphic user interfaces of the terminal 1300 which may be formed of images, texts, icons, videos or any combination thereof. The display unit 1340 may include a display panel 1341 optionally configured as a Liquid Crystal Display (LCD), an Organic Light-Emitting Diode (OLED), etc. Further, the touch-sensitive surface 1331 may cover the display panel 1341. When detecting a touch operation thereon or nearby, the touch-sensitive surface 1331 transmits it to the processor 1380 to determine the type of the touch event, and then the processor 1380 provides corresponding visual output on the display panel 1341 according to the type of the touch event. Although in FIG. 4, the touch-sensitive surface 1331 and the display panel 1341 realize the input and output function as two independent parts, in some embodiments the touch-sensitive surface 1331 and the display panel 1341 may be integrated to realize the input and output function.

The terminal 1300 may further include at least one sensor 1350, such as optical sensor, motion sensor and other sensor. The optical sensor may include ambient optical sensor and proximity sensor, wherein the ambient optical sensor may adjust the brightness of the display panel 1341 according to the brightness of the ambient light, and the proximity sensor may close the display panel 1341 and/or backlight when the terminal 1300 moves to the ear. As a motion sensor, the gravity acceleration sensor can detect the accelerations in various directions (generally in three axes), and detect the gravity size and direction when being still, so as to be used for applications recognizing phone attitudes (e.g., horizontal/vertical screen switching, related game, magnetometer attitude calibration, etc.) and related functions of vibration recognition (e.g., pedometer, knocking, etc.). The terminal 1300 may be further provided with other sensors such as gyroscope, barometer, hygrometer, thermometer and infrared sensor, which herein are omitted.

The audio circuit 1360, a loudspeaker 1361 and a microphone 1362 can provide an audio interface between the user and the terminal 1300. The audio circuit 1360 may transmit an electric signal converted from received audio data to the loudspeaker 1361, which converts the electric signal into a sound signal and outputs it. On the other hand, the microphone 1362 converts the collected sound signal into an electric signal, which is received by the audio circuit 1360 and converted into audio data. The audio data is outputted to the processor 1380 for a processing, and transmitted to for example another terminal through the communication unit 1310, or it is outputted to the memory 1320 for further processing. The audio circuit 1360 may further include an earplug jack to provide a communication between the external earphone and the terminal 1300.

In order to realize the wireless communication, the terminal may be provided with a wireless communication unit 1370 which may be a WIFI module. WIFI is a short distance wireless transmission technology, and the terminal 1300 can help the user to receive and transmit emails, browse webpage and access streaming media through the wireless communication unit 1370, thus the user is provided with a wireless broadband internet access. Although the wireless communication unit 1370 is illustrated in the drawing, it is not an essential component of the terminal 1300, and completely can be omitted upon demand without changing the essence of the present invention.

As the control center of the terminal 1300, the processor 1380 connects respective parts of the cell phone using different interfaces and lines, and performs various functions of the terminal 1300 and the data processing by running or executing the software programs and/or modules stored in the memory 1320 and calling the data stored in the memory 1320, thereby entirely monitoring the cell phone. Optionally, the processor 1380 may include one or more processing cores. Preferably, the processor 1380 may integrate an application processor mainly processing the operating system, the user interface and the application program, and a modem processor mainly processing the wireless communication. It shall be appreciated that the modem processor also may not be integrated in the processor 1380.

The terminal 1300 further includes a power supply 1390 (e.g., battery) which supplies power to the respective parts. Preferably, the power supply may be logically connected to the processor 1380 through a power management system to realize the functions of charging management, discharging management and power consumption management through a power management system. The power supply 1390 may further include one or more DC or AC power supplies, a recharging system, a power failure detection circuit, a power adapter or inverter, a power state indicator, etc.

Although not illustrated, the terminal 1300 may further include a camera, a Bluetooth module, etc., which are omitted herein.

In the embodiment, the terminal further includes one or more programs which are stored in the memory and configured to be executed by one or more processors. The one or more programs include instructions for performing the following method:

receiving a uniform resource locator (URL) and a title of a quick link to be added to a main page, the URL and the title being input by a user;

searching an icon in a pre-stored mapping relationship between URLs and icons according to the URL of the quick link; and if a corresponding icon is found, adding the corresponding icon to the main page, drawing the title of the quick link on the corresponding icon, and binding the URL of the quick link to the corresponding icon.

The one or more programs further include instructions for performing the following method:

if no corresponding icon is found and a web page corresponding to the quick link is opened, capturing a screenshot for the web page corresponding to the quick link, and using the captured screenshot as the icon of the quick link; and adding the icon of the quick link to the main page, drawing the title of the quick link on the icon of the quick link, and binding the URL of the quick link to the icon of the quick link.

The one or more programs further include instructions for performing the following method:

if no corresponding icon is found and a web page corresponding to the quick link is not opened, acquiring a pre-stored default icon; and adding the default icon to the main page, drawing the title of the quick link on the default icon, and binding the URL of the quick link to the default icon.

The one or more programs further include instructions for performing the following method:

after the binding the URL of the quick link to the default icon, intercepting in real time, according to the URL of the quick link, web pages opened on a mobile terminal, if it is intercepted that the web page corresponding to the quick link is opened on the mobile terminal, capturing a screenshot for the web page corresponding to the quick link, using the captured screenshot as a new icon of the quick link, and updating the default icon corresponding to the quick link on the main page to the new icon of the quick link.

The one or more programs further include instructions for performing the following method:

acquiring a URL and an icon of a website from a network server, and updating the pre-stored mapping relationship between URLs and icons according to the URL and the icon of the website.

According to the embodiments of the present disclosure, user's input URL and title of a quick link to be added are received; a pre-stored mapping relationship between URLs and icons is searched for a corresponding icon; if the corresponding icon is found, the icon is added to a main page, the title of the quick link is drawn on the icon, and the URL of the quick link is bound to the icon. In this way, the quick link is successfully added. In addition, a web page does not need to be extracted in the process of adding the quick link, which saves network traffic; and further, the user does not need to wait for a period of time, thereby improving efficiency in adding a quick link and enhancing user experience.

It should be noted that, during adding of a quick link by the terminal for adding a quick link provided in the above-described embodiments, the terminal according to the above embodiments is described by only using division of the above functional modules as an example. In practice, the functions may be assigned to different functional modules for implementation as required. To be specific, the internal structure of the terminal is divided into different functional modules to implement all or part of the above-described functions. In addition, the apparatus for speeding up Web page access and the method for speeding up Web page access pertain to the same concept, where the specific implementation is elaborated in the method embodiments, which is not detailed herein any further.

A person skilled in the art should understand that all or part of steps of the preceding methods may be implemented by hardware or hardware following instructions of programs. The programs may be stored in a non-transitory computer-readable storage medium and may be executed by at least one processor. The storage medium may be a read-only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for adding a quick link, comprising:
receiving a uniform resource locator (URL) and a title of a quick link to be added to a main page of a web browser running on a mobile device, the URL and the title being input by a user;
searching an icon in a pre-stored mapping relationship between URLs and icons according to the URL of the quick link, wherein the icons and the mapping relationship between URLs and icons are pre-stored in the mobile device applying the method during an installation of the web browser;
determining whether a corresponding icon is found in the pre-stored mapping relationship between URLs and icons according to the URL of the quick link; and
in accordance with a determination that no corresponding icon is found in the pre-stored mapping relationship between URLs and icons and a web page corresponding to the quick link has been opened:
displaying the web page corresponding to the quick link;
capturing a screenshot for the web page corresponding to the quick link;
generating an icon from the captured screenshot for the web page as the icon of the quick link;
adding the icon of the quick link to the main page;
drawing the title of the quick link on the icon of the quick link;
binding the URL of the quick link to the icon of the quick link;
in accordance with a determination that no corresponding icon is found in the pre-stored mapping relationship between URLs and icons and a web page corresponding to the quick link has not been opened:
acquiring a pre-stored default icon;
adding the default icon to the main page;
drawing the title of the quick link on the default icon; and
binding the URL of the quick link to the default icon.

2. The method according to claim 1, wherein after the binding the URL of the quick link to the default icon, the method further comprises:
monitoring in real time, according to the URL of the quick link, one or more web pages opened on the mobile device, comprising:
opening a first web page on the mobile device;
extracting a URL of the first web page opened on the mobile device;
comparing the extracted URL of the first web page with the URL of the quick link;
in accordance with a determination that the URL of the first web page matches the URL of the web page corresponding to the quick link:
capturing a screenshot for the first web page with the URL that matches the URL of the quick link;
generating a new icon from the captured screenshot for the first web page as the new icon of the quick link; and
replacing the default icon that was bound to the quick link on the main page with the new icon of the quick link.

3. The method according to claim 1, further comprising:
acquiring a URL and an icon of a website from a network server, and updating the pre-stored mapping relationship between URLs and icons according to the URL and the icon of the website.

4. A mobile terminal for adding a quick link, comprising one or more processors; and a non-transitory computer-readable storage medium storing one or more programs that, when executed by the one or more processors, cause the one or more processors to perform operations comprising:
receiving a uniform resource locator (URL) and a title of a quick link to be added to a main page of a web browser running on the mobile terminal, the URL and the title being input by a user;
searching an icon in a pre-stored mapping relationship between URLs and icons according to the URL of the quick link, wherein the icons and the mapping relationship between URLs and icons are pre-stored in the mobile terminal during an installation of the web browser;
determining whether a corresponding icon is found in the pre-stored mapping relationship between URLs and icons according to the URL of the quick link; and
in accordance with a determination that no corresponding icon is found in the pre-stored mapping relationship between URLs and icons and a web page corresponding to the quick link has been opened:
displaying the web page corresponding to the quick link;
capturing a screenshot for the web page corresponding to the quick link;
generating an icon from the captured screenshot for the web page as the icon of the quick link;
adding the icon of the quick link to the main page;
drawing the title of the quick link on the icon of the quick link;
binding the URL of the quick link to the icon of the quick link;
in accordance with a determination that no corresponding icon is found in the pre-stored mapping relationship between URLs and icons and a web page corresponding to the quick link has not been opened:
acquiring a pre-stored default icon;
adding the default icon to the main page;
drawing the title of the quick link on the default icon; and
binding the URL of the quick link to the default icon.

5. The terminal according to claim 4, the operations further comprising:
monitoring in real time, according to the URL of the quick link, one or more web pages opened on the mobile terminal, comprising:
opening a first web page on the mobile device;
extracting a URL of the first web page opened on the mobile device;
comparing the extracted URL of the first web page with the URL of the quick link;
in accordance with a determination that the URL of the first web page matches the URL of the web page corresponding to the quick link:
capturing a screenshot for the first web page with the URL that matches the URL of to the quick link;
generating a new icon from the captured screenshot for the first web page as the new icon of the quick link; and
replacing the default icon that was bound to the quick link on the main page with the new icon of the quick link.

6. The terminal according to claim 4, the operations further comprising:

acquiring a URL and an icon of a website from a network server, and updating the pre-stored mapping relationship between URLs and icons according to the URL and the icon of the website.

7. A non-transitory computer-readable medium storing instructions, the instructions, when executed by one or more processors, cause the one or more processors to perform operations comprising:
receiving a uniform resource locator (URL) and a title of a quick link to be added to a main page of a web browser running on a mobile device, the URL and the title being input by a user;
searching an icon in a pre-stored mapping relationship between URLs and icons according to the URL of the quick link, wherein the icons and the mapping relationship between URLs and icons are pre-stored in the mobile device applying the method during an installation of the web browser;
determining whether a corresponding icon is found in the pre-stored mapping relationship between URLs and icons according to the URL of the quick link; and
in accordance with a determination that no corresponding icon is found in the pre-stored mapping relationship between URLs and icons and a web page corresponding to the quick link has been opened:
displaying the web page corresponding to the quick link;
capturing a screenshot for the web page corresponding to the quick link;
generating an icon from the captured screenshot for the web page as the icon of the quick link;
adding the icon of the quick link to the main page;
drawing the title of the quick link on the icon of the quick link;
binding the URL of the quick link to the icon of the quick link;
in accordance with a determination that no corresponding icon is found in the pre-stored mapping relationship between URLs and icons and a web page corresponding to the quick link has not been opened:
acquiring a pre-stored default icon;
adding the default icon to the main page;
drawing the title of the quick link on the default icon; and
binding the URL of the quick link to the default icon.

8. The non-transitory computer-readable medium of claim 7, wherein after the binding the URL of the quick link to the default icon, the operations further comprise:
monitoring in real time, according to the URL of the quick link, one or more web pages opened on the mobile device, comprising:
opening a first web page on the mobile device;
extracting a URL of the first web page opened on the mobile device;
comparing the extracted URL of the first web page with the URL of the quick link;
in accordance with a determination that the URL of the first web page matches the URL of the web page corresponding to the quick link:
capturing a screenshot for the first web page with the URL that matches the URL of the quick link;
generating a new icon from the captured screenshot for the first web page as the new icon of the quick link; and
replacing the default icon that was bound to the quick link on the main page with the new icon of the quick link.

9. The non-transitory computer-readable medium of claim 7, wherein the operations further comprise:
   acquiring a URL and an icon of a website from a network server, and updating the pre-stored mapping relationship between URLs and icons according to the URL and the icon of the website.

\* \* \* \* \*